Oct. 11, 1932.  E. V. JOHNSON  1,881,633
OVERLOAD CLUTCH
Filed Sept. 3, 1926
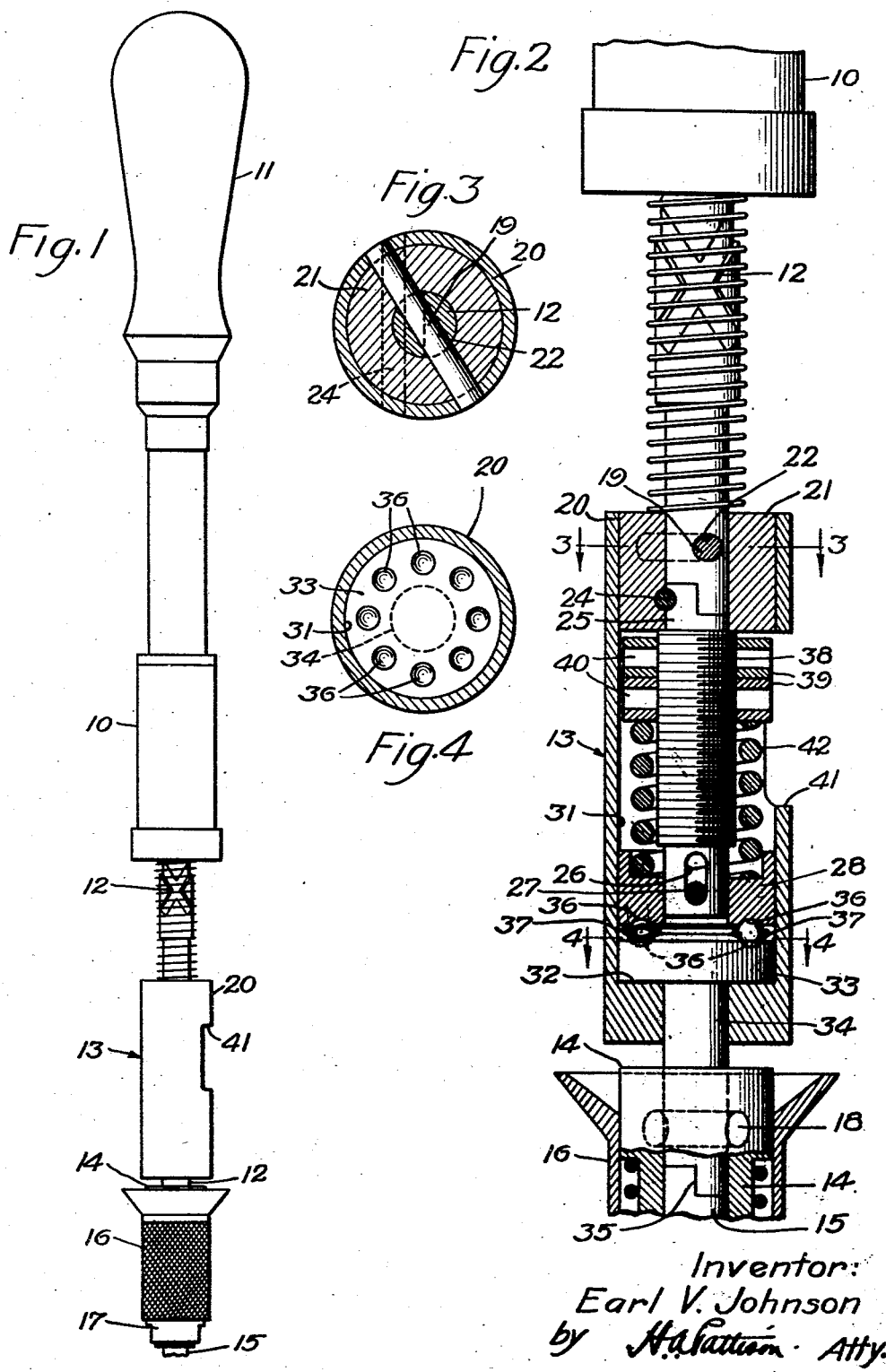
Inventor:
Earl V. Johnson
by H. A. Pattison Atty.

Patented Oct. 11, 1932

1,881,633

UNITED STATES PATENT OFFICE

EARL VICTOR JOHNSON, OF HINSDALE, ILLINOIS, ASSIGNOR TO WESTERN ELECTRIC COMPANY, INCORPORATED, OF NEW YORK, N. Y., A CORPORATION OF NEW YORK

OVERLOAD CLUTCH

Application filed September 3, 1926. Serial No. 133,319.

This invention relates to overload clutches, and more particularly to an overload clutch for rotatable tool mechanisms.

The object of this invention is to provide an improved overload clutch which may be readily attached to and detached from rotatable tool mechanisms.

In accordance with the general features of this invention there is provided in one embodiment thereof an overload clutch which is attachable as a unit to and inserted between an operating handle and a rotatable blade holder of an automatic screw driver of a usual type. The attachment comprises a housing containing driving and driven clutch members having opposed faces provided with depressions, with a ball retainer freely rotatable therebetween and carrying a plurality of balls independently rotatable and engaging the depressions of the clutch members. The pressure between the balls and the opposed clutch members is controlled by a spring associated with one of the members to determine the torque required to cause a relative movement between the clutch members. The housing is provided with a slot so that the spring may be readily adjusted without disassembling the clutch.

Other objects and advantages of this invention will more fully appear from the accompanying detailed description taken in connection with the accompanying drawing, in which Fig. 1 is a view of a manually operable automatic screw driver of a usual type of construction having an overload clutch embodying the features of the invention, operatively attached thereto;

Fig. 2 is an enlarged fragmentary view thereof, partly in section, and

Figs. 3 and 4 are sections on the lines 3—3 and 4—4, respectively, of Fig. 2.

Referring to the drawing, particularly to Fig. 1, wherein a manually operable automatic spiral screw driver of a well known type of construction is illustrated, the numeral 10 represents an operating member which is reciprocated by a handle 11. The operating member 10, in a well known manner, rotates a driven member 12, which before the attaching thereto of an overload clutch 13 to be presently described, supported at its lower end a tool or screw driver blade holder 14 of a well known type, a portion of a screw driver blade 15 being shown operatively connected thereto. Surrounding the holder 14 for the greater part of its length is a freely rotatable knurled sleeve or hand grip 16 secured in position relative to the holder 14 by a nut 17 (Fig. 1) threaded onto the lower end of the holder 14. The holder 14 in its previous assembled relation with the rotatable driven member 12 was fixed thereto by a pin 18 (Fig. 2) to be referred to hereinafter. The overload clutch 13 is rotatably secured at its upper end to the lower end of the member 12 of the automatic screw driver by a pin 19 passing through a clutch housing 20, a bushing 21, and an aperture 22 provided in the member 12 and previously used for the securing of the tool holder 14 thereto by the pin 18 hereinbefore referred to. The bushing 21 is fixed to the housing 20 by a pin 24 which also serves to attach thereto a stud 25 which abuts the lower end of the member 12 and thereby forms an extension thereto. Adjacent its lower end the stud 25 is provided with a slot 26 extending therethrough at right angles to its axis. Reciprocably attached to the lower end of the stud 25 and rotatable therewith by a pin 27 passing through the slot 26 is a collar 28 adapted to freely slide upwardly and downwardly upon an inner circular wall 31 of the housing 20. Free to rotate and slide within the housing 20 and resting upon a lower inner end wall 32 thereof is a driven member 33 provided with a depending reduced portion 34 which is an exact counterpart to the lower end of the driven member 12 of the automatic screw driver so that the tool holder 14 may be attached thereto by the pin 18 previously used to secure the holder 14 to the member 12. The driven member 33 is also adapted to have locked for rotation therewith the blade 15 by means of cooperating notched ends provided upon the driven member 33 and blade 15 as indicated at 35 (Fig. 2). The opposed parallel surfaces of the collar 28 and the driven member 33 are each provided with a plurality of similar concave depressions 36 equal in number and similarly spaced around the axis of the collar and the driven member.

Interposed between the opposed depressions 36 is a ball retainer 37 containing a plurality of hardened steel balls which may be equal in number to the depressions in one of the opposed surfaces or of a lesser number, the balls being adapted to roll into and out of the depressions without any undue friction. The ball retainer 37 may be of any standard construction and is adapted to freely rotate within the housing 20 without lateral movement therein. The upper end of the stud 25 is provided with a micrometer thread as indicated at 38 and threaded thereon is a pair of circular nuts 39 provided with a plurality of equally and radially arranged apertures 40 for the reception of a suitable pin or tool whereby the nuts may be moved upwardly or downwardly upon the stud 25, a slot 41 being formed in the wall of the housing 19 to permit the adjustment thereof without disassembly of the clutch, as will readily be apparent. Interposed between the lower nut 39 and the collar 28 is a coiled compression spring 42, the lower end of the spring resting in an annular depression provided in the collar 28.

It is believed that from the foregoing description the method of attaching the opposite ends of the unitary clutch 13 to the lower end of the driven member 12 and the upper end of the tool holder 14 to the lower end of the driven member 33, respectively, is clearly apparent. It will be understood that the attaching end portions of the clutch 13 are designed for attachment to the particular type of tool illustrated. For another type of tool the attaching end portions of the clutch might be slightly different.

In using a tool equipped with the overload clutch 13 as herein described, the pressure between the balls and the opposed clutch members, or the point at which a relative movement between the collar 28 and the driven member 33 will occur, is first affected by adjusting the lower nut 39 upon the thread 38 and thereafter locking it in position by means of the upper nut 39. The releasing load of the clutch is determined according to the nature of the work to be performed, but in each case this is merely a matter of calculation or experimentation and can be easily determined.

In the actuation of the tool operating mechanism illustrated an operator guides the lower end of the tool by grasping the sleeve 16 within which the holder 14 is freely rotatable, between the fingers and moves the handle 11 toward the sleeve 16, which causes the holder with the attached screw driver blade 15 to revolve. The rotation of the holder 14 is caused by the registering balls carried in the retainer 37 and the depressions 36 in the opposed surfaces of the collar 28 and the driven member 33. In the case of a screw, for example, being rotated to secure members together and upon the desired tightness being effected the balls carried by the retainer 37 in unison will roll up over the edges of the depressions in one or both of the opposed surfaces and thereby automatically cause a release of the clutch. Upon relative movement occurring between the clutch surfaces the balls rotatably mounted in the freely rotatable retainer 37, it will be apparent, serve to reduce the friction between the parts and consequently the wear thereon. In the particular application of the clutch with the proper adjustment thereon, an operator is enabled to drive a screw without any thought regarding the tightness of the screw or the stripping of the threads. Also, the finish of the driving stroke is not important or, in other words, the screw driver may be handled without allowing for the final tightening to be done in a certain portion of the stroke.

What is claimed is:

1. In an overload clutch, a housing having an inner wall, a rotatable driving member movably disposed in said housing and having an outer wall disposed in engagement with the inner wall of said housing, a driven member rotatably disposed in said housing, said driving and driven members each having oppositely disposed integral faces formed with a series of similarly arranged clutch depressions, a plurality of balls interposed therebetween, a member for maintaining the balls in predetermined spaced relation as a unitary assemblage, the assemblage being freely rotatable between the driving and driven members, means adjustably mounted for longitudinal movement upon the driving member, and a coiled compression spring substantially equal in circular contour to the unitary assemblage for urging said driving member toward said driven member and causing an equal pressure upon each of the balls in the assemblage, said driving member being guided by its engagement with the inner wall of said housing to aid in causing an equal pressure upon each of the balls of the assemblage.

2. In an overload clutch, a housing having an inner wall, a rotatable driving member movably disposed in said housing and having an outer surface disposed in engagement with the inner wall of said housing, a driven member rotatably journaled in said housing, means for frictionally connecting said driven member to said driving member including a circular arrangement of connecting members, and a compression spring substantially equal in circular contour with the circular arrangement of said connecting members for urging said driving member toward said driven member and causing an equal pressure upon each of said connecting members, said driving member being guided by its engagement with the inner wall of said housing to aid in causing an equal pressure upon each of said connecting members.

In witness whereof, I hereunto subscribe my name this 19th day of August, A. D. 1926.

EARL VICTOR JOHNSON.